(12) United States Patent
Stoval, III

(10) Patent No.: US 10,957,038 B2
(45) Date of Patent: Mar. 23, 2021

(54) MACHINE LEARNING TO DETERMINE CLINICAL CHANGE FROM PRIOR IMAGES

(71) Applicant: International Business Machines Corporation, Armonk, NY (US)

(72) Inventor: William M. Stoval, III, Acton, MA (US)

(73) Assignee: International Business Machines Corporation, Armonk, NY (US)

(*) Notice: Subject to any disclaimer, the term of this patent is extended or adjusted under 35 U.S.C. 154(b) by 124 days.

(21) Appl. No.: 16/266,304

(22) Filed: Feb. 4, 2019

(65) Prior Publication Data
US 2020/0250814 A1     Aug. 6, 2020

(51) Int. Cl.
| | |
|---|---|
| *G06T 7/00* | (2017.01) |
| *G06T 7/33* | (2017.01) |
| *G06T 5/50* | (2006.01) |
| *G06N 3/04* | (2006.01) |
| *G06N 20/00* | (2019.01) |

(52) U.S. Cl.
CPC ............ *G06T 7/0012* (2013.01); *G06N 3/04* (2013.01); *G06N 20/00* (2019.01); *G06T 5/50* (2013.01); *G06T 7/33* (2017.01); *G06T 2207/10081* (2013.01); *G06T 2207/10088* (2013.01); *G06T 2207/10104* (2013.01); *G06T 2207/10132* (2013.01); *G06T 2207/20081* (2013.01); *G06T 2207/20084* (2013.01); *G06T 2207/20224* (2013.01)

(58) Field of Classification Search
CPC .......... G06T 7/0012; G06T 7/33; G06T 5/50; G06T 2207/20224; G06T 2207/10132; G06T 2207/20084; G06T 2207/10104; G06T 2207/20081; G06T 2207/10088; G06T 2207/10081; G06N 3/04; G06N 20/00
See application file for complete search history.

(56) References Cited

U.S. PATENT DOCUMENTS

| | | | |
|---|---|---|---|
| 6,310,477 B1 * | 10/2001 | Schneider | .......... G01R 33/4822 324/307 |
| 6,549,646 B1 | 4/2003 | Yeh et al. | |
| 7,043,066 B1 | 5/2006 | Doi et al. | |
| 2005/0100208 A1 | 5/2005 | Suzuki et al. | |

(Continued)

OTHER PUBLICATIONS

Lin, Jyh-Shyan, Panos A. Ligomenides, S-CB Lo, Matthew T. Freedman, and Seong Ki Mun. "A hybrid neural-digital computer-aided diagnosis system for lung nodule detection on digitized chest radiographs." In Proceedings of IEEE Symposium on Computer-Based Medical Systems (CBMS), pp. 207-212. IEEE, 1994. (Year: 1994).*

(Continued)

*Primary Examiner* — Carol Wang
(74) *Attorney, Agent, or Firm* — Reza Sarbakhsh; Edell, Shapiro & Finnan, LLC

(57) ABSTRACT

Methods, systems, and computer readable media are provided for processing medical images. One or more prior medical images are aligned with a current medical image. Image subtraction between the current medical image and the one or more prior medical images is performed to produce one or more difference images. The one or more difference images are applied to a machine learning model to determine a presence or an absence of a medical condition.

21 Claims, 8 Drawing Sheets

(56) References Cited

U.S. PATENT DOCUMENTS

| | | | |
|---|---|---|---|
| 2005/0111718 | A1 | 5/2005 | Macmahom et al. |
| 2007/0092124 | A1 | 4/2007 | Moriya |
| 2009/0118600 | A1 | 5/2009 | Ortiz et al. |
| 2018/0122076 | A1* | 5/2018 | Abedini ............... A61B 5/6898 |
| 2019/0188870 | A1* | 6/2019 | Park ...................... G06K 9/0014 |
| 2019/0236783 | A1* | 8/2019 | Ichinose ................. G06T 7/337 |
| 2020/0138337 | A1* | 5/2020 | Choi .................... A61B 5/0878 |

OTHER PUBLICATIONS

Itai, Yoshinori, et al. "A new registration method with voxel-matching technique for temporal subtraction images." In Medical Imaging 2008: Computer-Aided Diagnosis, vol. 6915, p. 69153I. International Society for Optics and Photonics, 2008. (Year: 2008).*

Miyake, Noriaki, et al. "Automatic detection of lung nodules in temporal subtraction image by use of shape and density features." In 2009 Fourth international conference on innovative computing, information and control (ICICIC), pp. 1288-1292. IEEE, 2009. (Year: 2009).*

Shiraishi, Junji, Qiang Li, Daniel Appelbaum, and Kunio Doi. "Computer-aided diagnosis and artificial intelligence in clinical imaging." In Seminars in nuclear medicine, vol. 41, No. 6, pp. 449-462. WB Saunders, 2011. (Year: 2011).*

Kakeda, Shingo, et al. "Improved detection of lung nodules on chest radiographs using a commercial computer-aided diagnosis system." American Journal of Roentgenology 182, No. 2 (2004): 505-510. (Year: 2004).*

J. Yang et al., "Automated Dental Image Analysis by Deep Learning on Small Dataset." Conference: 2018 IEEE 42nd Annual Computer Software and Applications Conference (COMPSAC) Jul. 2018, DOI: 10.1109/COMPSAC.2018.00076.

A. Dong et al., "Comparison of Single Image Processing and Bilateral Image Feature Subtraction in Breast Cancer Detection," Proc 2011 International Conference on Data Mining (DMIN 2011), R. Stahlbock, ed., pp. 230-235, 2011.

J. Celaya-Padilla et al., "Bilateral Image Subtraction and Multivariate Models for the Automated Triaging of Screening Mammograms," BioMed Research International, vol. 2015, Article ID 231656, 12 pages, 2015. https://doi.org/10.1155/2015/231656.

M. Baffa et al., "Convolutional Neural Networks for Static and Dynamic Breast Infrared Imaging Classification." 2018 31st SIBGRAPI Conference on Graphics, Patterns and Images (SIBGRAPI 2018).

K. Bovis et al., "Detection of masses in mammograms using texture features," Proceedings 15th International Conference on Pattern Recognition. ICPR-2000, Barcelona, Spain, 2000, pp. 267-270 vol. 2.

H. Zhao et al., "Automatic temporal subtraction of chest radiographs and its enhancement for lung cancers," Medical Imaging 2001: Image Processing, Milan Sonka and Kenneth M. Hanson, Eds., Proceedings of SPIE, (2001) vol. 4322.

M. Noor et al., "Hyperspectral Image Enhancement and Mixture Deep-Learning Classification of Corneal Epithelium Injuries," Sensors (2017) vol. 17, pp. 2644.

J. Nam, "Development and Validation of Deep Learning-based Automatic Detection Algorithm for Malignant Pulmonary Nodules on Chest Radiographs," Radiology (2018) vol. 290, No. 1 (Abstract).

* cited by examiner

US 10,957,038 B2

MACHINE LEARNING TO DETERMINE CLINICAL CHANGE FROM PRIOR IMAGES

TECHNICAL FIELD

Present invention embodiments relate to automated techniques for analysis of images, and more specifically, to machine learning techniques and data analytics of temporal medical images for diagnosis of a disease such as cancer.

DISCUSSION OF THE RELATED ART

Traditional approaches for identifying diseases may include analyzing a single image from a patient to obtain a diagnosis or predicted diagnosis. However, such processes are traditionally both intensive and time consuming, as well as subject to human error, (e.g., different radiologists may reach different conclusions when analyzing the same image).

The medical industry is in the early stages of adopting artificial intelligence (Ai)/machine learning (ML) to aid in the diagnosis of medical diseases, with the goal to achieve a diagnosis earlier and more accurately than with traditional methods. Ai algorithms may analyze an image for the presence of one or more features, and may classify the image into a respective category based upon the presence of the one or more features.

Although advances in optimizing machine learning models to improve classification of images and in automation have been made, allowing certain imaging tasks to become more automated, these techniques are limited in scope and are not standardized. Additionally, due to heterogeneity in the patient population, ensuring that the classification is accurate and not an artifact remains challenging.

SUMMARY

According to embodiments of the present invention, computer-implemented methods, systems, and computer readable media are provided for aligning, via a processor, one or more prior medical images with a current medical image. Image subtraction is performed between the current medical image and the one or more prior medical images to produce one or more difference images. The one or more difference images are applied to a machine learning model to determine a presence or an absence of a medical condition. Present techniques are able to identify patient specific changes as a function of time with improved accuracy and precision. As the neural net evaluates images based on block pixel intensity, changes that may not be visible to the human eye are evaluated by the deep learning neural net. In some cases, the system may scale the difference images, and provide the difference images to the user, so that the user can visualize the changes detected by the deep learning neural net.

In embodiments, the one or more prior medical images and the current medical image are auto-scaled to produce images of a same size. Registration is performed on the auto-scaled images to align anatomy within those images. Image subtraction is performed with respect to pixel intensity between corresponding pixel blocks within the auto-scaled images in order to align the one or more prior medical images with a current medical image. Auto-scaling ensures that the current and prior images are matched according to size, while registration allows fine tuning of alignment of the images. These techniques ensure that pixel blocks from the current image and prior image are aligned, such that during subtraction, the differences between the two images are retained, and the unchanged regions essentially cancel out.

In aspects, the machine learning model is trained on a training set including a first set of difference images associated with a presence of the medical condition and a second set of difference images associated with an absence of the medical condition. This approach allows the neural net to classify images as normal or cancerous.

In another embodiment, for each pixel block of the current medical image and the one or more prior medical images, an intensity value of a pixel having a highest intensity is determined and the intensity value is assigned to each pixel of the pixel block. This approach helps ensure that small regions of intensity are preserved during image processing. For example, during image subtraction, small misalignments between the current and prior image may cause single high intensity pixels or small groups of high intensity pixels to be subtracted out. However, by assigning the value of the highest intensity pixel to a block of pixels, the high intensity pixels are more likely to be retained in the difference image.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

DETAILED DESCRIPTION

Methods, systems, and computer readable media are provided for analyzing temporal patient images using machine learning and data analytics to provide a diagnosis for a patient. Present techniques allow for automated and consistent classification and analysis of images to ensure accurate diagnosis and to provide timely treatment for a patient. These techniques use a machine learning module, and in particular neural nets, to classify images based on morphological characteristics of the images.

In some aspects, the same type of image from the same patient may be obtained as a function of time. In other aspects, the system may make the classification based on upon a population of images from different patients when a prior image from the same patient is not available. In still other aspects, present techniques may be used to monitor cancer or disease treatments to determine whether the treatment is reducing the size/frequency of the tumor/metastasis.

While many of the examples presented herein are in the context of mammography, present techniques may be applied across any suitable imaging domain (e.g., including 1D data such as ECG waveforms, CT scans, MRI, PET images, radiography, etc.).

Present techniques may be applied to any suitable anatomy, including but not limited, to head, breast, arm, leg, neck, chest, hand, foot, pelvis, abdominal region, etc. Present techniques are suitable for both anatomical regions with high consistency and low rates of change (e.g., a time series of cranial images). However, other anatomies which may change as a function of time, e.g., due to normal aging processes, are also suitable for analysis by present techniques.

Present techniques provide a robust approach to analyzing temporal medical images in a uniform, consistent manner. Additionally, the system may generate a diagnostic report for the physician based on the results of the classification and data analytics. The report may include a diagnosis, in cases in which the system identifies a single medical condition; a candidate diagnosis, in cases in which the classification and data analytics identify one or more diseases; or may be indeterminate. In cases in which the system identifies multiple candidate diagnoses, the system may list the candidate diagnoses ranked based on likelihood of occurrence and with recommended follow-up testing to differentiate between these candidate diagnoses.

In some cases, the portion of the image which indicates the presence of a disease is marked for physician review. The pixel intensity may be adjusted to highlight the differences to the physician/radiologist. These techniques aid a physician's decision making and diagnosis, while reducing physician error and improving patient care.

Figure 1:
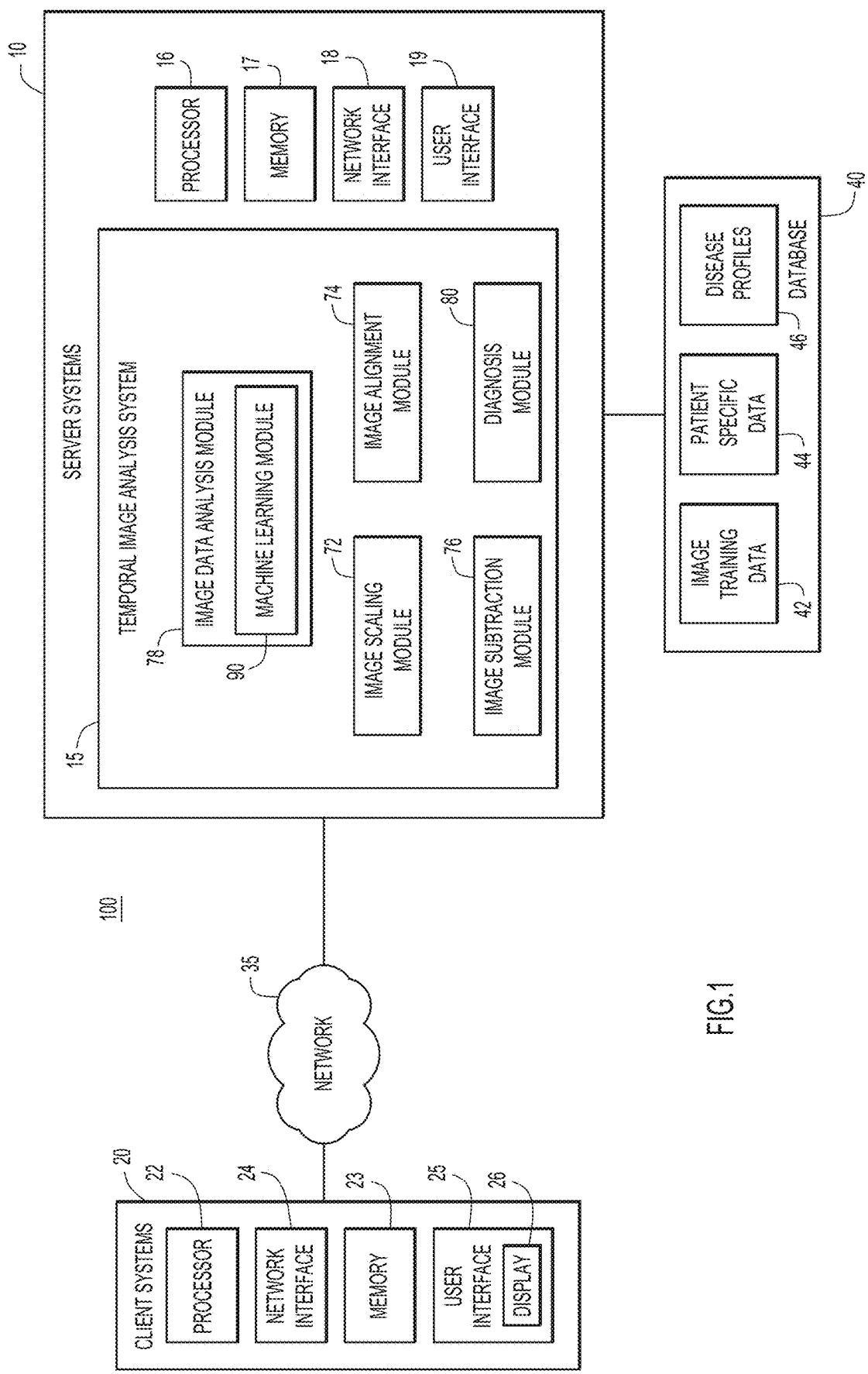
FIG. 1 is a block diagram of an example computing environment for automated temporal image analysis, according to embodiments of the present disclosure.

An example environment for use with present invention embodiments is illustrated in FIG. 1. Specifically, the environment includes one or more server systems 10, and one or more client or end-user systems 20. Server systems 10 and client systems 20 may be remote from each other and communicate over a network 35. The network may be implemented by any number of any suitable communications media (e.g., wide area network (WAN), local area network (LAN), Internet, Intranet, etc.). Alternatively, server systems 10 and client systems 20 may be local to each other, and communicate via any appropriate local communication medium (e.g., local area network (LAN), hardwire, wireless link, Intranet, etc.).

Client systems 20 enable users to submit documents (e.g., medical images, temporal medical images, labeled images, etc.) to server systems 10 for analysis, to generate a diagnosis or a list of possible diagnoses. The server systems include a temporal image analysis system 15 to analyze medical images of patients from X-rays, CT scans, MRIs, PETs, radiographs EKGs, and in some cases, sonograms, etc.

A database system 40 may store various information for the analysis (e.g., image training data 42, patient-specific data 44, disease profiles 46, etc.). The database system may be implemented by any conventional or other database or storage unit, may be local to or remote from server systems 10 and client systems 20, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired documents (e.g., diagnostic images) and analysis, and may provide reports including analysis results (e.g., predicted diagnosis, list of possible diagnoses, recommended follow-up diagnostic testing, normal results, inconclusive results, etc.).

Server systems 10 and client systems 20 may be implemented by any conventional or other computer systems preferably equipped with a display or monitor, a base (e.g., including at least one processor 16, 22, one or more memories 17, 23 and/or internal or external network interfaces or communications devices 18, 24 (e.g., modem, network cards, etc.)), optional input devices (e.g., a keyboard, mouse or other input device), user interface 19, 25 (with a display 26), and any commercially available and custom software (e.g., server/communications software, temporal image analysis system 15, browser/interface software, etc.).

Alternatively, one or more client systems 20 may analyze images (e.g., temporal images, etc.) to determine classification and analysis results of a medical images by the temporal image analysis system 15 when operating as a stand-alone unit. In a stand-alone mode of operation, the client system stores or has access to the data (e.g., image training data 42, patient specific data 44, disease profiles 46, etc.), and includes a temporal image analysis system 15. The graphical user (e.g., GUI, etc.) or other interface (e.g., command line prompts, menu screens, etc.) solicits information from a corresponding user pertaining to the desired images and analysis, and may provide reports including analysis results (e.g., predicted diagnosis, list of possible diagnoses, recommended follow-up diagnostic testing, normal results, inconclusive results, etc.).

Temporal image analysis system 15 may include one or more modules or units to perform the various functions of present invention embodiments described below. The various modules (e.g., image scaling module 72, image alignment module 74, image subtraction module 76, image data analysis module 78, diagnosis module 80, etc.) may be implemented by any combination of any quantity of software and/or hardware modules or units, and may reside within memory 17, 23 of the server and/or client systems for execution by processor 16, 22.

Figure 2:
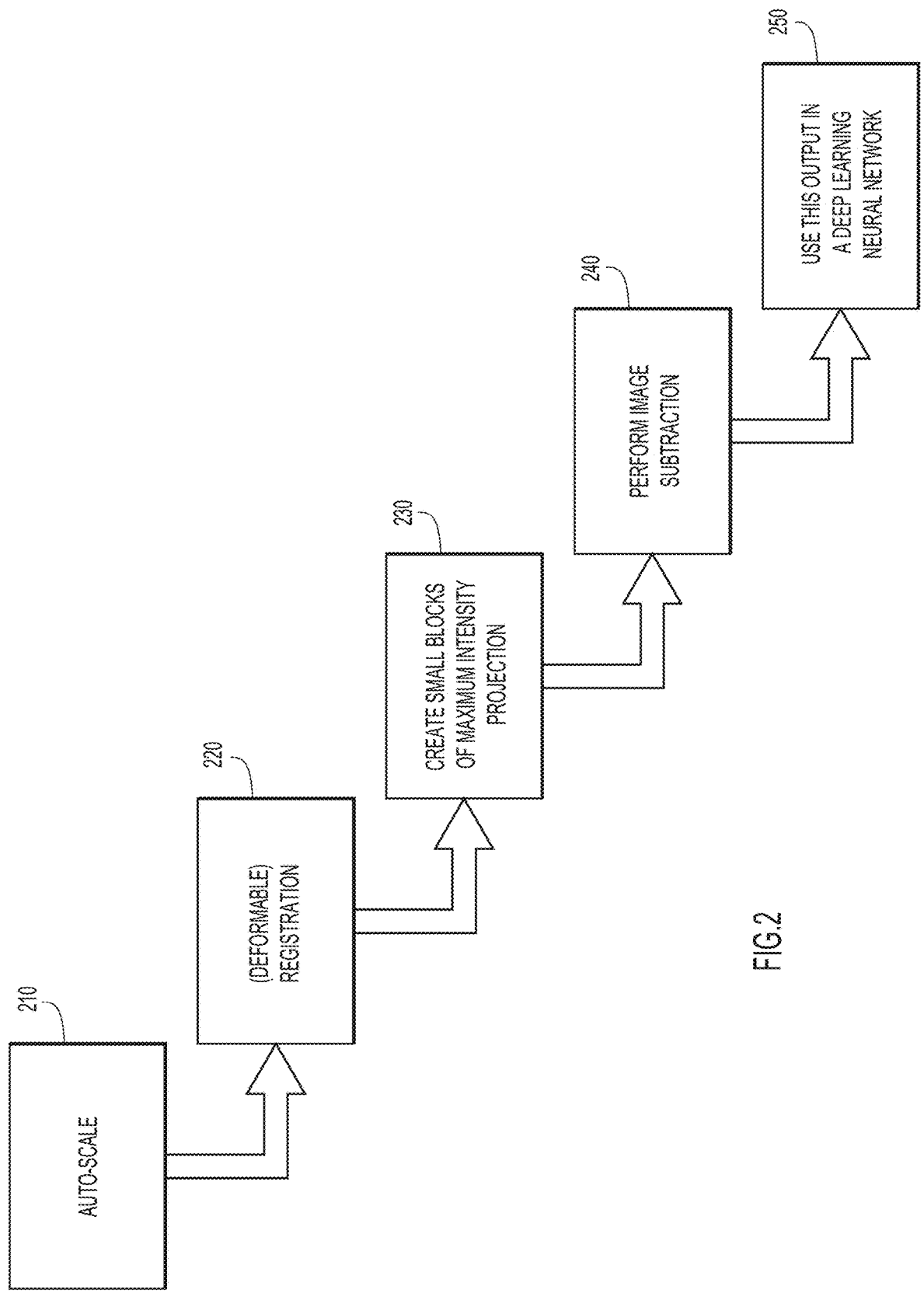
FIG. 2 is a flow diagram showing image processing for generating images suitable for neural net analysis, according to embodiments of the present disclosure.

Image scaling module 72 may scale images to align features of the image (see, e.g., FIG. 2, operation 210). For example, if a current image and a prior image are taken at different magnifications, the image scaling module may scale the first image such that the features of the first image generally align with the features of the second image. For example, for a chest X-ray, the image may be scaled such that when the first image and the second image are superimposed or overlaid, the features (e.g., for a chest X-ray, the left lung, the right lung, the heart, the liver, the trachea, etc.) are aligned to have the same or about the same relative position within the image.

Image alignment module 74 may receive the scaled image and may deform portions of the image in a process referred to as registration to improve fine alignment of the features of the images. In some aspects, the current image and the prior image may be segmented into features (see, e.g., right lung, left lung, heart, trachea, liver/abdominal region, etc.), and each feature or portions thereof may be compressed or expanded in order to better align the features of the current image with the same features of the prior image.

In some aspects, images may not be able to be aligned without large scale deformations. If large scale deformations are propagated throughout the image, regions of high pixel intensity may become misaligned, leading to artifacts (e.g., a high number of high intensity regions may falsely suggest metastasis) or other processing outputs that may lead to false positives or false negatives. Accordingly, an upper limit (e.g., a threshold limit) may be imposed upon registration, which may trigger manual review by a radiologist if the features of the current and prior images cannot be aligned within the threshold. In general, deformation should improve resolution of the system, by improving alignment of regions of high intensity, thereby improving the sensitivity of the system. In some aspects, deformation may be used to compensate for age-related changes (e.g., changes in bone density, muscle mass, etc.).

As an alternative, rather than adjusting individual features, the entire image may be deformed. In this approach, markers may be present within each image, e.g., a scale bar corresponding to a distance, and the image may be deformed to match position and size of the scale bars.

Image subtraction module 76 may group adjacent pixels into blocks of pixels. The blocks of pixels may undergo a thresholding operation (e.g., the value of the highest intensity pixel is assigned to the entire group) or an averaging operation (e.g., the values of the group of pixels are averaged). Examples of such operations are provided in FIGS. 4A and 4B. The current and prior image may be subtracted to form a subtracted image, and the subtracted image provided to image data analysis module 78, for analysis by the machine learning module 90 (e.g., a neural net, a deep learning neural net, etc.).

Image data analysis module 78 may use a machine learning module to classify the subtracted image into a respective category (e.g., malignant, benign, normal, indeterminate, etc.). A variety of machine learning techniques may be implemented by ML module 90 including but not limited to statistical classification, supervised learning, unsupervised learning, artificial neural networks, deep learning neural networks, cluster analysis, random forest, dimensionality reduction, binary classification, decision tree, etc. Any suitable machine learning technique may be implemented by the machine learning module 90.

Analysis of images by the machine learning module may be determined based on various morphological properties, including but not limited to feature shape, feature size, intensity of pixels, size of pixel intensity cluster, number of intensity clusters, age of patient, etc. The image data analysis module may classify the image into one of several categories, including normal, indeterminate, benign or malignant. As additional biological samples are processed, the machine learning module may be retrained using the new data to improve classification of images over time. In cases in which multiple subtracted images are provided to the machine learning system, the image data analytics module may combine the individual results (e.g., based on simple majority, or by more heavily weighting recent images over images in the distant past, etc.) to generate a diagnosis or predicted diagnoses.

Diagnosis module 80 may receive output(s) of the image data analysis module 78. Based on the received input, the diagnosis module may provide output indicating the determined disease, if a prediction is made within a sufficiently high level of confidence. If the image classification and analysis system identifies a plurality of candidate diagnoses, and is unable to provide a definitive diagnosis falling with a statistical threshold, then the diagnosis module may provide recommendations for additional follow-up testing to rule out one or more of the candidate diagnoses. Alternatively, the image classification and analysis system may provide information to the patient indicating that the image is normal or indeterminate.

Image training data 42 comprises training data (e.g., difference images of normal and abnormal temporal images for a patient) used to train the ML model or neural net. Patient-specific data 44 includes results (e.g., reports, disease predictions, etc.) for a particular patient whose images were applied to the neural net. Disease profiles 46 may include profiles of various diseases—when the neural net cannot generate a diagnosis, a list of candidate diseases may be provided to the patient for further evaluation based on the disease profiles.

In some aspects, the present system may be provided as a software as a solution ("SaaS") service, in which a physician uploads the current image to the system to receive a returned result comprising a categorization (e.g., malignant, benign, unknown/indeterminate, normal, etc.). The retuned result may comprise an image with features determined to be malignant or benign highlighted. A radiologist or other physician may review the highlighted results to make a clinical judgement (e.g., agree, disagree, indeterminate). User feedback from the physician may be provided to the system for improving the accuracy and precision of the neural net.

FIG. 2 shows example operations for processing the images prior to providing the subtracted image to a deep learning neural network. In particular, operations 210 through 240 show a normalization process for processing images prior to providing these images to a neural net for analysis.

At operation 210, the images may be auto-scaled to ensure that the images are properly aligned. For example, the current image and each prior image may be scaled such that the features of the image are the same size or about the same size. At operation 220, deformable (or other) registration operations on the images may be performed to align anatomical features. This will ensure that the features of the image are aligned such that subtraction of the current image from a prior image will generate a map of image changes (e.g., features that have not changed will have about the same shape and intensity and therefore are common features that may be removed during subtraction).

Adjacent pixels may be grouped together at operation 230, such that small blocks of pixel intensity are generated. Examples are provided in FIGS. 3A and 3B. At operation 240, the current image t2 may be subtracted from prior image t1 to generate a subtraction based image which is (t2−t1) that corresponds to intensity changes in the image as a function of time (e.g., the pixel changes that happen between the current and prior image). Other embodiments are possible for operation 240, and examples are provided below in reference to FIGS. 4A-4B. The output of image subtraction, subtraction image 250, is provided to the machine learning system (e.g., deep learning neural network) for analysis.

Figure 3:
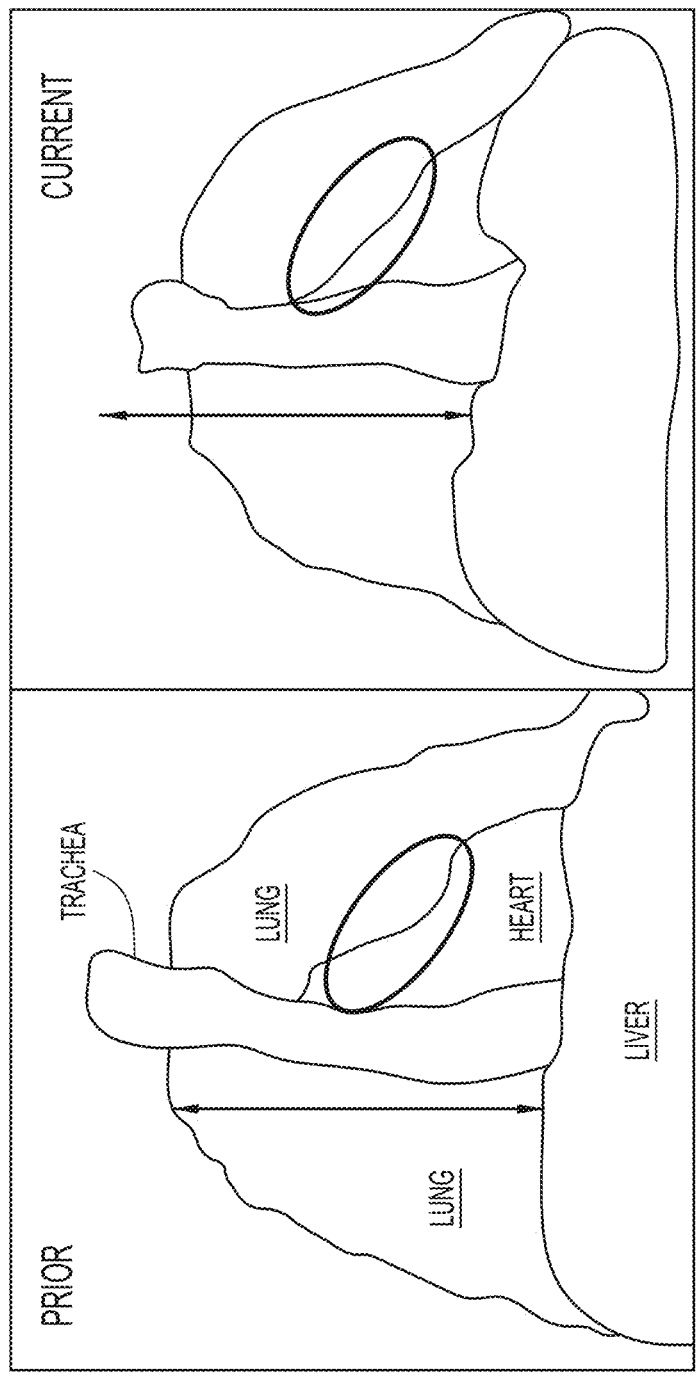
FIG. 3 is an illustration of a chest X-ray showing regions in which scaling and deforming operations may be implemented for generating difference images suitable for neural net analysis, according to embodiments of the present disclosure.

FIG. 3 shows illustrations of an example chest X-ray obtained as a function of time from the same patient. As can be seen by these images, the current image should be auto-scaled to match the feature dimensions of the prior image. As the total height of the lung cavity (shown by the arrow) in the prior image is not of a similar size as the current image, the images are of different scales and adjustment is needed.

Similarly, the circular regions show feature regions that may exhibit change as a function of time (e.g., aging) or perhaps due to variations in patient orientation during imaging. Provided that distorted regions are not indicative of an underlying pathology, the system may deform the image (either globally, in which the entire image may be deformed; or locally, in which individual features such as the heart and lung may be deformed) to improve alignment of features within the overlain images.

Figure 4A:
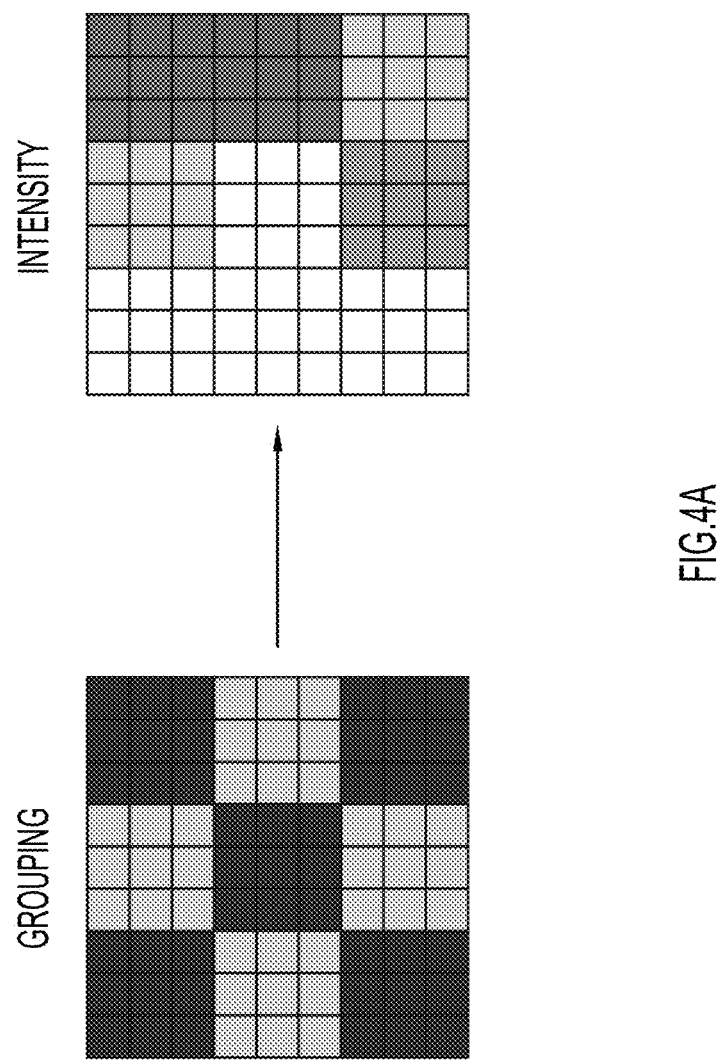
FIG. 4A is an illustration of pixels of a medical image showing grouping and intensity assignment of blocks of pixels based on adjacency, according to embodiments of the present disclosure.

FIG. 4A shows an example of grouping pixels into groups of nine pixels and intensity assignment of the grouped pixels for an image. Any suitable number of pixels may be grouped together. Initially, the pixels grouped into clusters of nine pixels. After grouping, intensity assignment of the grouped pixels are performed. In this embodiment, the pixel with the highest intensity of the grouped pixels is assigned to the entire group of pixels, and thus, each group of nine pixels is assigned a corresponding intensity, reflected by grayscale intensity. Once both the current and prior image(s) are processed to group pixels and assign intensities, the current image may be subtracted from the prior image, on a block by block basis, to generate a subtracted image to be provided to the machine learning system.

Figure 4B:
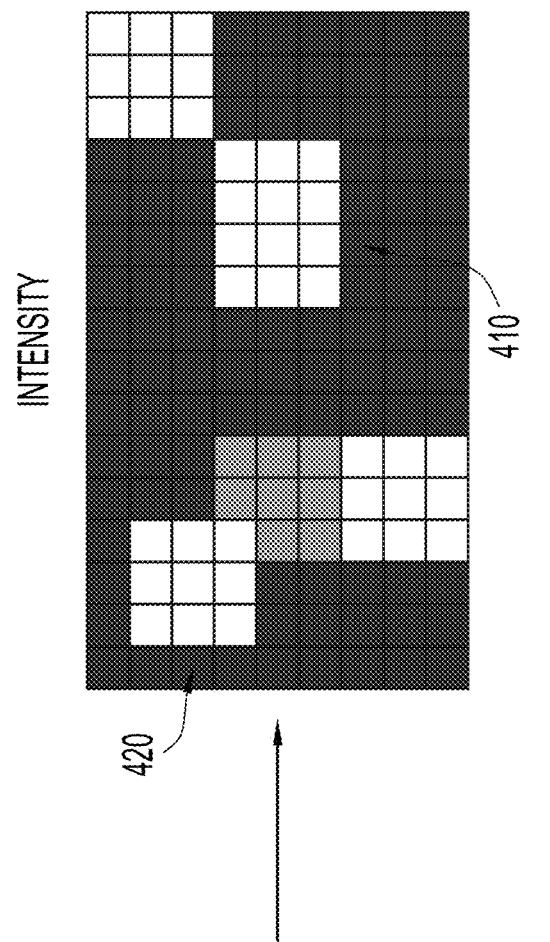
FIG. 4B is an illustration of pixels of a medical image showing grouping and intensity assignment of blocks of pixels based on identifying high pixel intensity, according to embodiments of the present disclosure.

FIG. 4B shows another example of grouping pixels in an image into groups of nine pixels, based on identifying high pixel intensity. In this embodiment, high intensities for pixels are identified with the image and groups of pixels are formed around the high intensity pixel. The block of pixels are assigned a value (e.g., the highest intensity may be assigned to the group, or an average intensity of the pixels may be assigned to the group). In some aspects, adjacent pixels having high intensities may be combined to form a 12 pixel group (see, block 410). In other aspects, overlapping groups may be assigned the higher intensity (see, block 420). Once the images are processed to group pixels and assign intensities, the current image may be subtracted from the prior image, on a block by block basis, to generate an image to be provided to the machine learning system.

Evaluating pixels as groups (blocks) reduces error rates, ensuring that regions of the image which could indicate an underlying medical issue are not lost during preprocessing. If multiple prior images are available, the system may compute a subtracted image between the current image and each prior image (e.g., t3–t2, t3–t1, ... ), or between successive images (t3–t2, t2–t1, ... ). Each subtracted image may be provided to the machine learning system to generate a corresponding output provided to the diagnosis module, which provides a report based upon the combined outputs.

Figure 5:
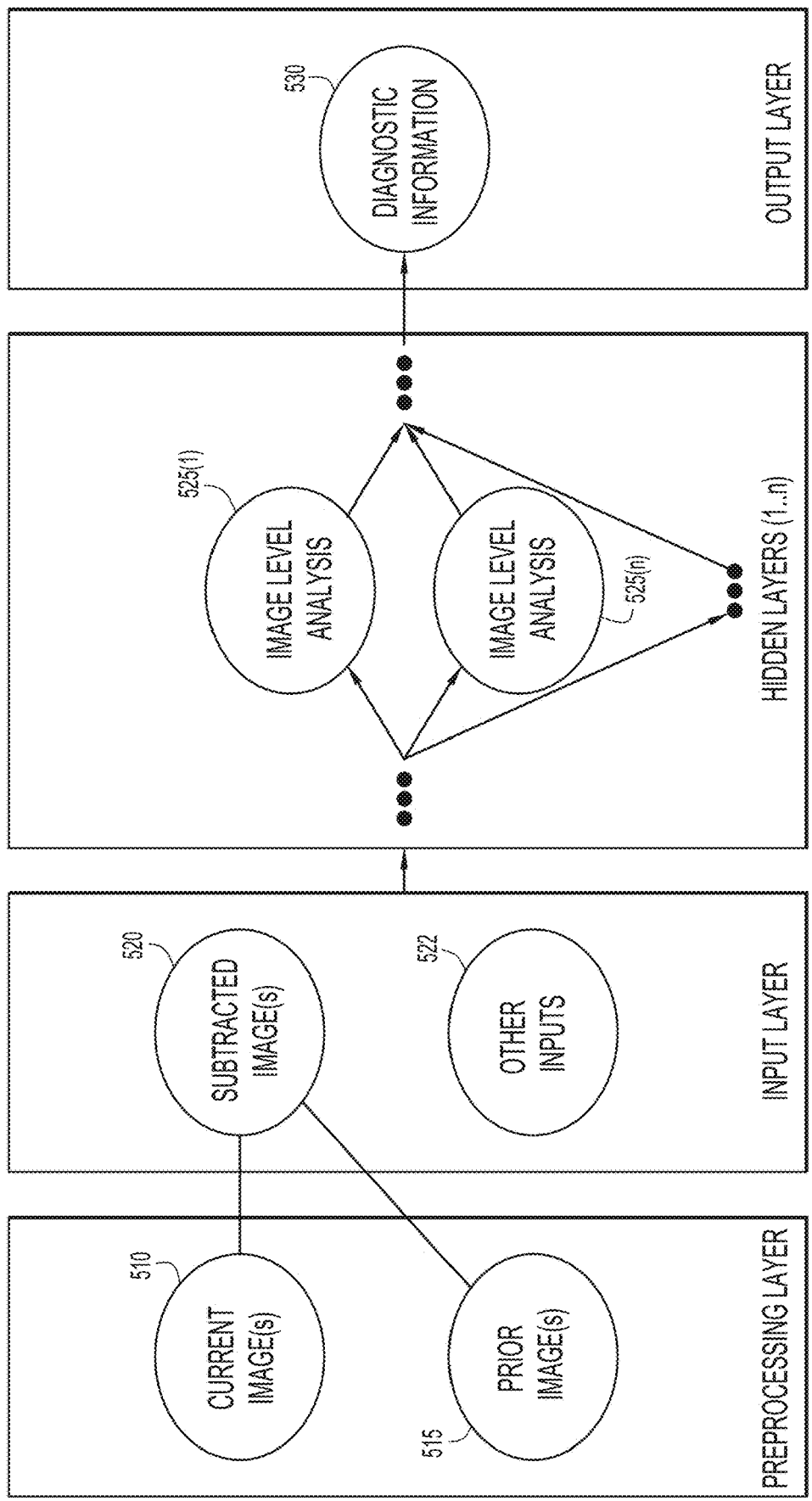
FIG. 5 is a flowchart of a neural net workflow, beginning with preprocessing the images through providing diagnostic information, according to embodiments of the present disclosure.

FIG. 5 is a flow diagram showing a deep learning neural network for generating a diagnosis. Current image 510 may be a current diagnostic image (e.g., an X-ray, CT scan, MRI, PET, etc.) obtained from a patient. Prior image(s) 515 may be past diagnostic images obtained from a patient. These images may be processed according to the techniques in FIG. 2 to generate a subtracted image 520 that is provided to the input layer of the deep learning neural network. The current image may be subtracted from any one of the prior images 515. Other inputs 522 may be provided as well (e.g., age of patient, type of image, corresponding anatomical structure, etc.)

Each input may be assigned a weight and provided to one or more hidden layers. Typically, two, three, or more hidden layers may be present. In some cases, the number of hidden layers may be increased until reaching a suitable accuracy and precision for the output of the deep learning system. Techniques for constructing deep learning neural nets are known in the art.

One or more image level analysis 525 functions may be present in hidden layers (1 . . . n), wherein each image level analysis function may perform one or more operations to detect a feature corresponding to determining a diagnosis. For example, the subtracted image may be analyzed for pixel intensity or average pixel intensity over a block, wherein pixel intensity corresponds to a disease such as cancer (e.g., due to microcalcification). In some aspects, processing the image through one or more hidden layers may identify various features, and these results may be aggregated to generate a disease diagnosis or candidate diagnoses 530 (see, e.g., FIG. 6).

The deep learning neural net may identify lesions, cancerous images, normal images, normal age related changes (e.g., mass reduction), benign images, stages of cancer, metastasis, treatment efficacy of a therapeutic, other diseases (aneurysm), etc.

A deep learning neural net system may be used to determine certain clinical scenarios (typically either normal or disease identification). By providing a deep learning system with difference images, the deep learning neural net may identify patterns present in the difference image that be not be visible to the human eye or that may have high complexity (e.g., a cancer difference image that may appear materially different than a normal follow-up). Determination of the presence of cancer may be based upon intensity and/or patterns, large mass, small mass (e.g., detection of 1 mm lesions in lymph nodes), etc. The Ai system may be trained to distinguish between extra calcifications that are not cancer and small masses that are cancer. As this technique is refined, it may be more precise than being processed manually by a radiologist or other health care professional.

The machine learning system may be trained with training data 42, which may include data that has undergone curation by a subject matter expert. As new data (e.g., images that have been classified) becomes available, the machine learning system may be improved by training with this newly available data. In some aspects, training data include a first set of difference images associated with a presence of the medical condition and a second set of difference images associated with an absence of the medical condition. For example, for cancer, the images may include cancerous images subtracted from normal images. In some aspects, a training data set may include a few hundred images up to about a thousand images. Accordingly, the machine learning system may determine the presence or the absence of cancer.

Additionally, the machine learning system may determine that no changes have occurred between the current medical image and a prior medical image. For patients having cancer, a determination of no change may indicate that the cancer is slow growing or, if treatment has been initiated, that the therapy may be inhibiting the growth of but not reducing the size of the tumor. In patients without cancer, a determination of no change may indicate that the patient remains without detectable cancer.

In one embodiment, for training a deep learning neural net, training data sets are provided in which a difference image is determined from a normal prior image and a current cancer image (based on ground truth of biopsy results). This "difference image" is positive for cancer.

Also included in this training data set are difference images determined from a normal prior image and a current non-cancerous image (based on ground truth of biopsy results). This "difference image" is negative for cancer. Thus, the system may be trained to identify cancerous and non-cancerous images.

In some aspects, present techniques may be combined with other tests, such as blood tests to identify high risk patients.

Figure 6:
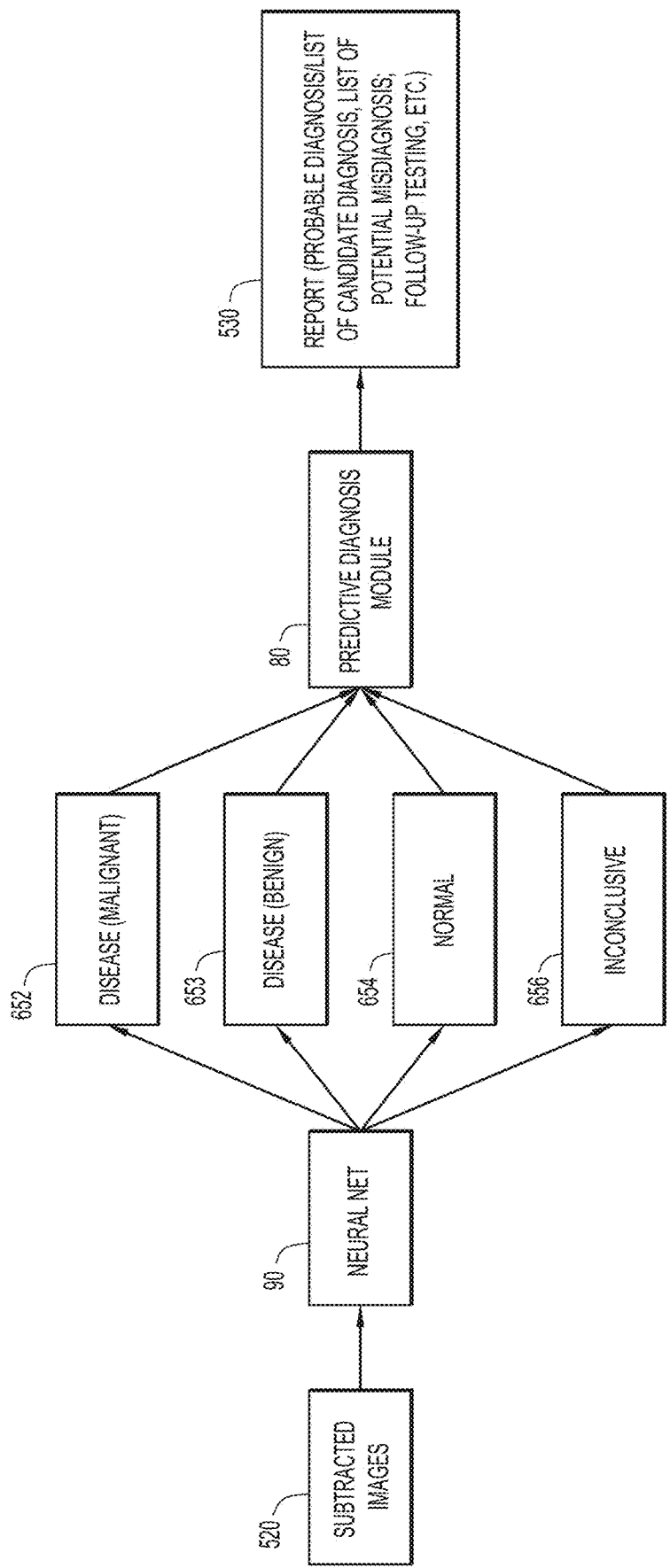
FIG. 6 is a flow diagram showing output of the neural net, according to embodiments of the present disclosure.

FIG. 6 shows a flow chart of the output of the machine learning module 90. Subtracted images 520 are provided to the machine learning system, in this case, neural net 90. (Additional inputs may be provided.) The output of the neural net may include a predicted malignant disease 652, a predicted benign disease 653, a normal result 654, or an inconclusive result 656. These outputs may be provided to diagnosis module 80, which generates a report 530 to send to a physician or user, the report including probable diagnosis/list of candidate diagnosis, list of potential misdiagnosis, and recommended follow-up testing, etc.

Figure 7:
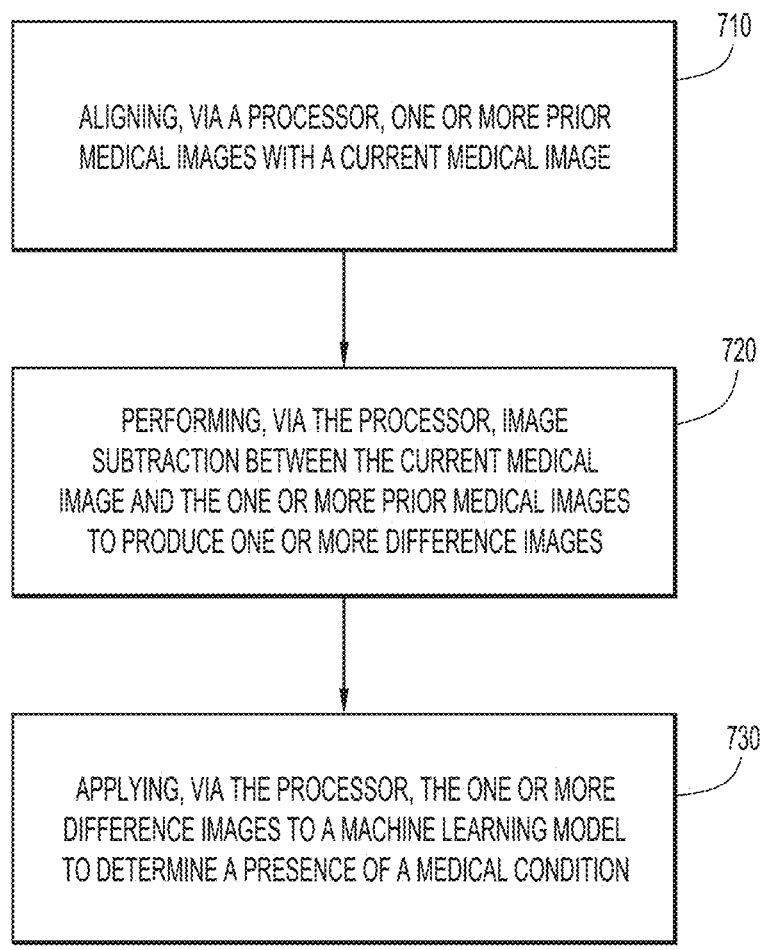
FIG. 7 is a high level flow diagram of the temporal image analysis system, according to embodiments of the present disclosure.

FIG. 7 is a high level flowchart of operations for the temporal image analysis system. At operation 710, one or more prior medical images is aligned with a current medical image. At operation 720, image subtraction is performed between the current medical image and the one or more prior medical images to produce one or more difference images. At operation 730, the one or more difference images are applied to a machine learning model to determine a presence or an absence of a medical condition.

Present techniques may be applied to any diagnostic image, and in which the presence and amount of pixel intensities may be associated with a disease and/or categories of diseases. Advantages of present techniques include improvements over current Ai/ML systems that analyze images by simply determining presence of normal and/or abnormal features of a single image snapshot in time. In contrast, present techniques are able to evaluate temporal changes in images from a patient, in order to detect changes or rule-out changes in the patient.

Present techniques may also improve analysis as compared to humans performing manual review of current and prior images. Present techniques may detect changes in pixel intensities that are not visible to the human eye. For example, if regions of the image appear to be underexposed or overexposed, subtraction techniques presented herein may still detect intensity changes that may be invisible to the human eye. The techniques provided herein may provide insights/learnings that humans aren't able to see/comprehend.

Present techniques may detect disease as well as disease progression. By evaluating a time series of images, early detection of metastasis may be detected, and early detection of whether a treatment is working may be detected (e.g., whether a tumor mass is shrinking or increasing after a therapeutic treatment).

Present techniques may not need a large number of annotated images, which can be time consuming and expensive. For example, present techniques may need relatively small data sets for training (e.g., a few hundred to a few thousand images) rather than tens of thousands of annotated images. Accordingly, computational analysis by the neural net may be fast, as relatively small datasets may be used, thus lowering processing cost requirements.

It will be appreciated that the embodiments described above and illustrated in the drawings represent only a few of the many ways of implementing embodiments for automating diagnosis of a disease based on temporal medical images from a patient. In cases in which the machine learning system cannot reach a suitable diagnosis, the images and quantitative results may be tagged by the system for review by a radiologist.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, temporal image analysis system 15, etc.). These systems may include any types of monitors and input devices (e.g., keyboard, mouse, voice recognition, etc.) to enter and/or view information.

It is to be understood that the software (e.g., temporal image analysis system 15, including image scaling module 72, image alignment module 74, image subtraction module 76, image data analysis module 78, diagnosis module 80, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., temporal image analysis system 15, image scaling module 72, image alignment module 74, image subtraction module 76, image data analysis module 78, diagnosis module 80, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., image training data 42, patient specific data 44, disease profiles 46, output and reports from the machine learning module 90 and the diagnosis module 80, etc.). The database system may be implemented by any number of any conventional or other databases, data stores or storage structures (e.g., files, databases, data structures, data or other repositories, etc.) to store information (e.g., image training data 42, patient specific data 44, disease profiles 46, etc.). The database system may be included within or coupled to the server and/or client systems. The database systems and/or storage structures may be remote from or local to the computer or other processing systems, and may store any desired data (e.g., image training data 42, patient specific data 44, disease profiles 46, etc.).

The present invention embodiments may employ any number of any type of user interface (e.g., Graphical User Interface (GUI), command-line, prompt, etc.) for obtaining or providing information (e.g., image training data 42, patient specific data 44, disease profiles 46, predictive diagnostic results, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., a definitive diagnosis, indeterminate results (e.g., possible candidate diagnoses and follow-up medical testing recommendations), normal results, etc.).

The present invention embodiments are not limited to the specific tasks or algorithms described above, but may be utilized for any suitable image in which pixel intensity and pixel distribution may indicate the presence or the absence of a disease.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of processing medical images comprising:
   aligning, via a processor, one or more prior medical images with a current medical image;
   performing, via the processor, image subtraction between the current medical image and the one or more prior medical images to produce one or more difference images; and
   applying, via the processor, the one or more difference images to a machine learning model to determine a presence or an absence of a medical condition, wherein the machine learning model is trained on a training set including a first set of difference images associated with a presence of the medical condition and a second set of difference images associated with an absence of the medical condition, and wherein the first set of difference images is produced by performing image subtraction between medical images of patients in which the medical condition is present, and corresponding prior medical images of same patients obtained before the medical condition is present.

2. The method of claim 1, wherein aligning the one or more prior medical images with the current medical image comprises:
   auto-scaling the one or more prior medical images and the current medical image to produce images of a same size;
   performing registration on the auto-scaled images to align anatomy within those images; and
   performing image subtraction with respect to pixel intensity between corresponding pixel blocks within the auto-scaled images.

3. The method of claim 1, wherein the machine learning model includes a deep learning neural network.

4. The method of claim 3, wherein the deep learning neural network includes a plurality of layers to perform image level analysis on the one or more prior medical images and the current medical image and an analysis of the one or more difference images.

5. The method of claim 1, wherein the medical condition includes one of a disease and a normal condition.

6. The method of claim 1, further comprising:
   determining, for each pixel block of the current medical image and the one or more prior medical images, an intensity value of a pixel having a highest intensity, and assigning the intensity value to each pixel of the pixel block.

7. The method of claim 1, wherein the medical images are selected from the group consisting of X-ray images, CT images, MRI images, PET images, and ultrasound images.

8. A system for processing medical images comprising at least one processor configured to:
   align one or more prior medical images with a current medical image;
   perform image subtraction between the current medical image and the one or more prior medical images to produce one or more difference images; and
   apply the one or more difference images to a machine learning model to determine a presence or an absence of a medical condition, wherein the machine learning model is trained on a training set including a first set of difference images associated with a presence of the medical condition and a second set of difference images associated with an absence of the medical condition, and wherein the first set of difference images is produced by performing image subtraction between medical images of patients in which the medical condition is present, and corresponding prior medical images of same patients obtained before the medical condition is present.

9. The system of claim 8, wherein the processor is further configured to:
   auto-scale the one or more prior medical images and the current medical image to produce images of a same size;
   perform registration on the auto-scaled images to align anatomy within those images; and
   perform image subtraction with respect to pixel intensity between corresponding pixel blocks within the auto-scaled images in order to align the one or more prior medical images with a current medical image.

10. The system of claim 8, wherein the machine learning model includes a deep learning neural network.

11. The system of claim 10, wherein the deep learning neural network includes a plurality of layers to perform image level analysis on the one or more prior medical images and the current medical image and an analysis of the one or more difference images.

12. The system of claim 8, wherein the medical condition includes one of a disease and a normal condition.

13. The system of claim 9, wherein the processor is further configured to:
   determine, for each pixel block of the current medical image and the one or more prior medical images, an intensity value of a pixel having a highest intensity, and assigning the intensity value to each pixel of the pixel block.

14. The system of claim 8, wherein the medical images are selected from the group consisting of X-ray images, CT images, MRI images, PET images, and ultrasound images.

15. A computer program product for processing medical images, the computer program product comprising one or more computer readable storage media collectively having program instructions embodied therewith, the program instructions executable by a computer to cause the computer to:
   align one or more prior medical images with a current medical image;
   perform image subtraction between the current medical image and the one or more prior medical images to produce one or more difference images; and
   apply the one or more difference images to a machine learning model to determine a presence of a medical condition, wherein the machine learning model is trained on a training set including a first set of difference images associated with a presence of the medical condition and a second set of difference images associated with an absence of the medical condition, and wherein the first set of difference images is produced by performing image subtraction between medical images of patients in which the medical condition is present, and corresponding prior medical images of same patients obtained before the medical condition is present.

16. The computer program product of claim 15, wherein the instructions are further executable by the computer to cause the computer to:
   auto-scale the one or more prior medical images and the current medical image to produce images of a same size;
   perform registration on the auto-scaled images to align anatomy within those images; and
   perform image subtraction with respect to pixel intensity between corresponding pixel blocks within the auto-scaled images in order to align the one or more prior medical images with a current medical image.

17. The computer program product of claim 15, wherein the machine learning model includes a deep learning neural network.

18. The computer program product of claim 17, wherein the deep learning neural network includes a plurality of layers to perform image level analysis on the one or more prior medical images and the current medical image and an analysis of the one or more difference images.

19. The computer program product of claim 15, wherein the medical condition includes one of a disease and a normal condition.

20. The computer program product of claim 15, wherein the instructions are further executable to:
   determine, for each pixel block of the current medical image and the one or more prior medical images, an intensity value of a pixel having a highest intensity, and assigning the intensity value to each pixel of the pixel block.

21. The computer program product of claim 15, wherein the medical images are selected from the group consisting of X-ray images, CT images, MRI images, PET images, and ultrasound images.

* * * * *